United States Patent [19]

Mowry

[11] Patent Number: 4,522,617
[45] Date of Patent: Jun. 11, 1985

[54] CONVERSION BELT AND STOP PLATE ASSEMBLY FOR UPSTACKING CORRUGATED BOX MACHINERY

[75] Inventor: Donald E. Mowry, Norwalk, Ohio

[73] Assignee: Don Mowry Flexo Parts, Inc., Norwalk, Ohio

[21] Appl. No.: 522,387

[22] Filed: Aug. 12, 1983

[51] Int. Cl.³ .................. B31B 1/98; B65H 31/08
[52] U.S. Cl. ...................... 493/126; 493/204; 271/212; 414/93
[58] Field of Search .............. 53/541; 414/92, 93, 414/94; 271/212; 493/126, 204

[56] References Cited

U.S. PATENT DOCUMENTS

| | | | |
|---|---|---|---|
| 1,657,595 | 1/1928 | Swift | 271/212 |
| 1,671,790 | 5/1928 | Staude | 271/212 |
| 3,212,774 | 10/1965 | Ingalls | 271/212 |
| 3,585,909 | 6/1971 | Carrel | 414/92 |
| 3,744,649 | 7/1973 | Ward | 414/92 |
| 4,378,938 | 4/1983 | Staniszewski | 414/94 |

Primary Examiner—Lowell A. Larson
Assistant Examiner—William E. Terrell
Attorney, Agent, or Firm—Emch, Schaffer & Schaub

[57] ABSTRACT

An improved stop plate and belt assembly for the stacking section of a corrugated box machine and an improved system for conveying corrugated boxes from the folding section to the stacking section of a corrugated box machine.

3 Claims, 10 Drawing Figures

CONVERSION BELT AND STOP PLATE ASSEMBLY FOR UPSTACKING CORRUGATED BOX MACHINERY

BACKGROUND OF THE INVENTION

Corrugated boxes are typically produced in large machines which have several sections, each of which performs one or more steps in the mass production of the boxes. These sections often include an inking section, a gluing section, a folding section, a delivery section and a stacking section.

In operation, corrugated board is sent into the inking section of the corrugated box machine. Here the board is cut, printed and scored for folding. From the inking section the board travels into the gluing section where a bead of glue is applied along one edge of the board. The board then travels into the folding section where long rotating belts convey the board and cause the outer edges of the board to be folded inwardly along the score lines. As the edges fold over, the glued edge is folded onto the unglued edge to form a seal. Once the board is glued, folded and sealed, it then passes into the delivery section which facilitates the transfer of the finished corrugated box from the folding section into the stacking section where the boxes are readied for shipment.

Many corrugated box machines utilize what is termed an "upstacking" unit in the stacking section of the machine. As the name implies, an upstacking unit stacks boxes from the bottom up with each new box being fed into the bottom of the stack. Due to the nature of the prior art equipment, it is not uncommon for the newly formed boxes to become bent and jammed as they are transferred from the folding section into the stacking section via the delivery apparatus. It is therefore an object of the present invention to provide a corrugated box machine with a delivery apparatus which will facilitate the transfer of boxes from the folding to the stacking section and reduce the tendency of the boxes to jam during this procedure.

The corrugated board is conveyed through the machine by drive belts which grip the sides of the board. One set of belts is used to convey the board through the inking, gluing, folding and delivery sections of the machine while a separate set of belts are used in the stacking section. Because the stacking section stacks the boxes from the bottom up, a pair of spiral lifting gears are disposed between the delivery and stacking section belts to lift the box stack and allow the exiting boxes to be fed into the bottom of the stack.

The rotation of the spiral lifting gears is timed with the rotation of the belts. Consequently, when the belts stretch, the timing goes off and there is an increased risk of the boxes jamming as they enter the spiral lifting gears. In addition, not all thickness of boxes can be run using the same spiral lifting gear. As a result, it is sometimes necessary to stop the machine and change the spiral lifting gears to accomodate a production run of boxes of a different thickness. It is therefore an object of the present invention to provide a simplified and improved mechanism for conveying boxes into the stacking section of a corrugated box machine which does not require the use of spiral lifting gears.

After the newly formed boxes have gone into the spiral lifting gears, the leading edges of the boxes abut a vertical stop plate which serves to align the boxes prior to their being removed from the stack in predetermined lots. Newly formed corrugated boxes will often have box chips partially attached to them as a result of the cutting process. As the boxes move toward the stop plate, the box chips will oftentimes break away from the boxes and cause one of several problems relative to the stop plate. One problem is that the chips get caught in the holes in the stop plate where the belts pass through the plate. If this happens, the belts jam thus necessitating the stopping of the machine so that the box chips can be manually cleared from the stop plate. Another problem involves the chips exerting undue pressure on the belts which causes friction and premature wearing and replacement of the belts. This extra friction can also cause the lacings on the belts to wear through and the belts to separate. Finally, if the box chips get caught between the box and the stop plate, they can prevent the boxes from abutting the stop plate which in turn can cause jamming of the boxes in the spiral lifting gears. It is therefore another object of the present invention to provide a stop plate and belt assembly for the stacking section of a corrugated box machine which reduces the tendency of jamming due to box chip build-up.

The prior art stop plate used to align the leading edges of the boxes also has a vertical front surface with a driven knurled wheel positioned midway up the vertical front surface. The purpose of the knurled wheel is to help move the boxes up the plate. However, the knurled wheel also grinds material off the leading edges of the boxes which eventually clogs the wheels and they then become inoperable. It is therefore an object of the present invention to provide a simplified stop plate which will reduce the binding and clogging problems as the boxes move up the stop plate.

Other objects and advantages of the present invention will become apparent as the invention is described hereinafter in detail and with reference to the accompanied drawings.

SUMMARY OF THE INVENTION

The present invention consists of an improved stop plate and belt assembly for the stacking section of a corrugated box machine and an improved system for conveying corrugated boxes from the folding section to the stacking section of a corrugated box machine.

The stacking section of a corrugated box machine is separate from the inking, gluing, folding and delivery sections of the machine. As a result, the stacking section has its own set of driven conveyer belts which are separate from the main drive belt assemblies which run through the remainder of the machine. To insure proper transfer of the newly formed cardboard boxes from the delivery section to the stacking section, there must be a proper interface between the two drivebelt assemblies.

In the past, the top of the drive belt assemblies in the delivery and stacking sections have lain in the same plane. Disposed between the two drive belt assemblies there has been a pair of vertical spiral lifting gears which contact the outer edges of the corrugated boxes and gradually lifted them up and out of the way of the next exiting box from the folding section. In so doing, the boxes can be vertically stacked from the bottom up.

There are several inherent problems with the use of this spiral lifting gear mechanism. First, the spiral must be properly timed with the rate of box delivery or else jamming can occur. Secondly, corrugated box machines must be capable of producing boxes of varying thicknesses. Due to the tolerances of the machine, not all thicknesses of boxes can be run using the same size spiral gear. Consequently, the spiral lifting gears must be changed to accommodate the thickness of the box being run. This obviously results in costly downtime while the spirals are being changed. Thirdly, the boxes will sometimes become bent as a result of their traveling up the spiral and this impairs quality control. The present invention therefore includes an improved and simplified interface between the drive belt assemblies of the delivery and stacking sections. The vertical spiral gears have been removed and the drive belts of the stacking section have been brought closer to and raised slightly above the drive belts of the delivery section. With this improved design, the above problems are reduced thus yielding a more versatile and efficient machine.

With the present invention, the leading edge of a box exiting the delivery section contacts the frontmost curved section of the plurality of drive belts in the stacking section. At the point of contact, the stacking section drive belts are traveling upwardly while the delivery section belts are propelling the box forward. The combination of belt movements thus causes the leading edge of the box to move upwardly and underneath the previously exited box. As the leading edge of the box moves onto the flat upper surface of the stacking section drive belts, the box is pinched between the box immediately above it and the rotating drive belts, thus causing the box to be drawn toward the stop plate. By using this arrangement and orientation of belts, the spiral lifting gears are no longer needed, thus simplifying the transfer of boxes and reducing the possibilities of jamming.

The stacking section of the prior art apparatus contains a vertical stop plate which is used to stop and align the boxes exiting the delivery section of the corrugated box machine. The prior art stop plate has a plurality of slots along the lower edge of the stop plate which allow passage of the drive belts through the stop plate. In addition, the prior art stop plate has a row of knurled rollers positioned midway up the stop plate which rotate about a horizontal axis. Both the rollers and the slots in the stop plate are frequent areas for jamming due to the accumulation of box chips ad cardboard dust from the stacked boxes.

The improved stop plate assembly of the present invention has eliminated the rollers in the stop plate and slanted the front face of the stop plate rearwardly to reduce the drag on the boxes as they move upwardly. In addition, through the use of a series of guide rollers and a newly designed stop plate, the drive belts of the stacking section of the present invention pass beneath the stop plate thus reducing the chance of box chip accumulation against the stop plate and possible jamming.

BRIEF DESCRIPTION OF THE DRAWINGS

FIG. 4 shows the leading edge of a box exiting the delivery section and contacting the moving drive belts of the stacking section, according to the present invention;

FIG. 5 shows the leading edge of the box from FIG. 4 passing underneath the vertical stack of boxes and being moved in a direction toward the stop plate;

FIG. 6 shows the trailing edge of the box from FIG. 5 leaving the delivery section of the machine, according to the present invention;

FIG. 7 shows the boxes in vertical alignment with a predetermined number of the uppermost boxs being swept off the top of the stack;

DESCRIPTION OF THE PREFERRED EMBODIMENT

Figure 1:
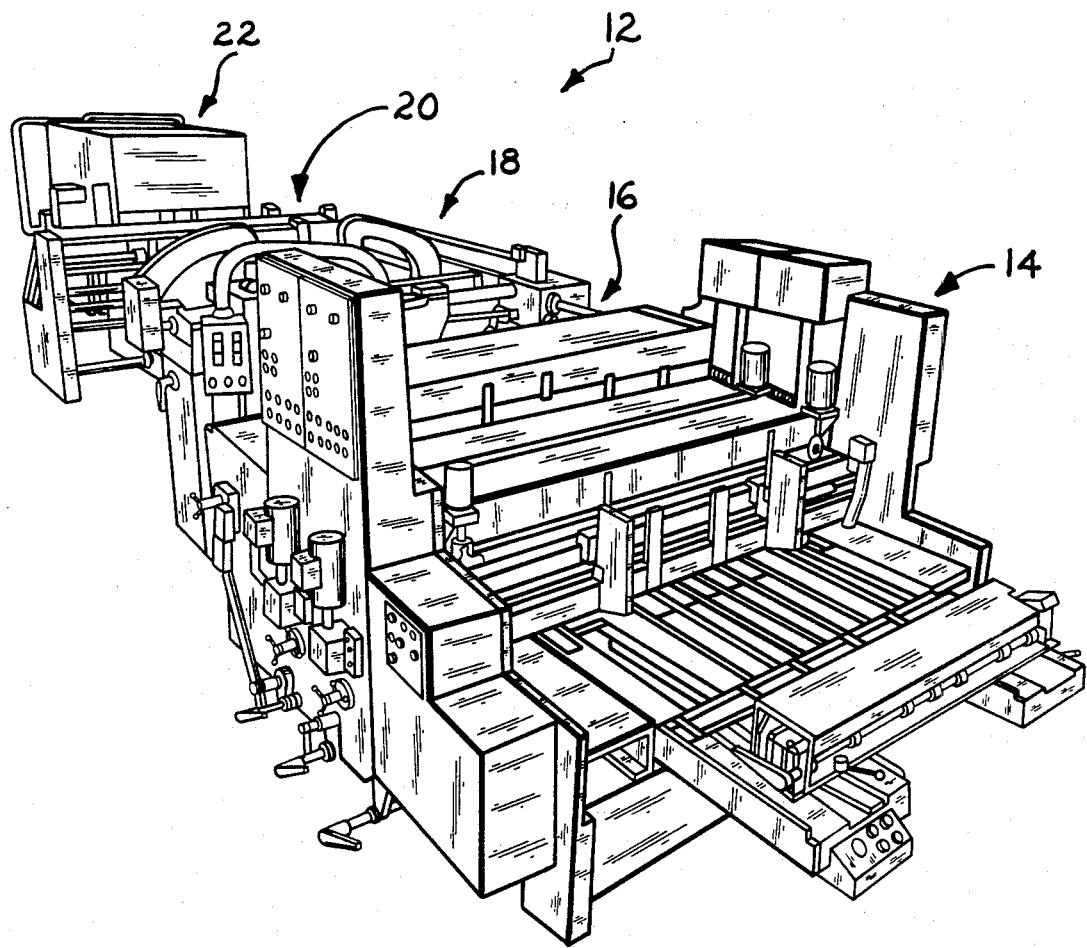
FIG. 1 is a perspective view of a corrugated box machine having inking, gluing, folding, delivery and stacking apparatus.

Referring now to FIG. 1, portions of a typical corrugated box machine 12 are generally depicted. They include an inking section 14, a gluing section 16, a folding section 18, a delivery section 20, and a stacking section 22. The present invention includes an improved means of transferring the newly formed corrugated boxes from the delivery section 20 into the stacking section 22 and an improved means for stacking the boxes.

In operation, corrugated board stock is fed into the inking section 14. Here the corrugated board is printed, scored for folding and cut to form the box flaps. As a result of the cutting process, scraps of corrugated board called box chips are created which sometimes do not totally separate from the board. As has been discussed, these box chips can cause considerable problems once the boxes enter the delivery and stacking sections 20 and 22, of the corrugated box machine 12.

From the inking section 14, the corrugatd board travels into the gluing section 16 where a bead of glue is applied to one edge of the board. The board then travels into the folding section 18 where the outer edges are folded over on the score lines and glued together thus forming a corrugated box. From the folding section 18, the box then passes into the delivery section 20 which transfers the boxes into the stacking section 22 of the machine.

Figure 2:
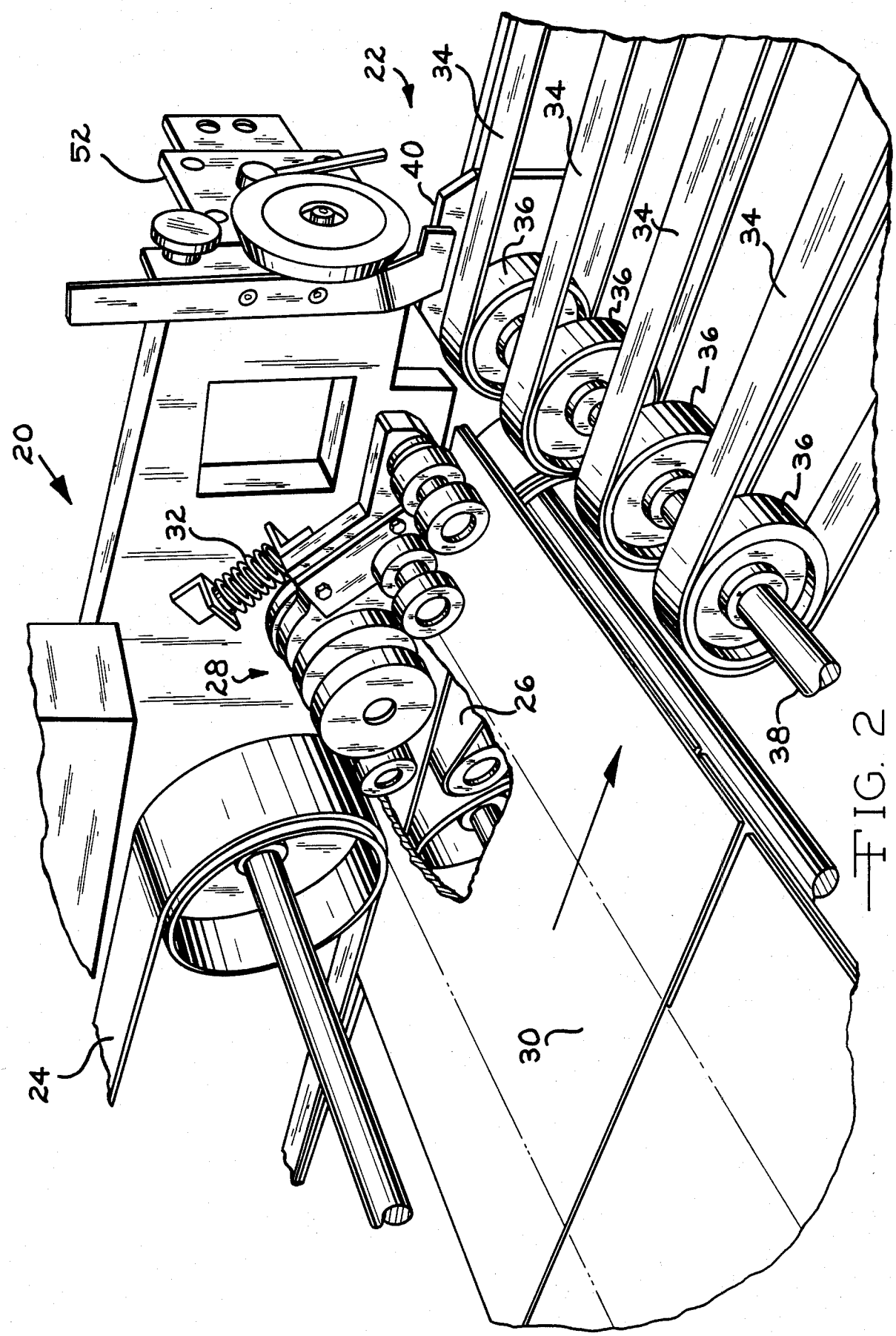
FIG. 2 is a perspective view of the interface between the delivery and stacking portions of a corrugated box machine, according to the present invention.

The corrugated board is sent through the inking 14, gluing 16, folding 18, and delivery 20 sections of the machine by a pair of upper and lower main drive belt assemblies 24 and 26 as shown in FIG. 2. The assemblies 24 and 26 are positioned on either side of the machine 12 and are laterally adjustable to grasp the outer edges of varying sizes of corrugated board stock. The lower main drive belt assembly 26 extends beyond the upper main drive belt assembly 24 as can be seen in FIG. 2. Directly above the extended portion of the lower main drive belt assembly 26 and in front of the upper main drive belt assembly 24 is positioned an idler guide assembly 28 which serves to aid the transfer of the newly formed box from the delivery section 20 to the stacking section 22.

The idler guide assembly 28 is held against the top surface of the box 30 by way of a spring 32. As the box 30 moves upwardly from the delivery section 20 into the stacking section 22, the idler guide assembly 28 pivots upwardly to adjust to the upward movement of the box 30.

Figure 3:
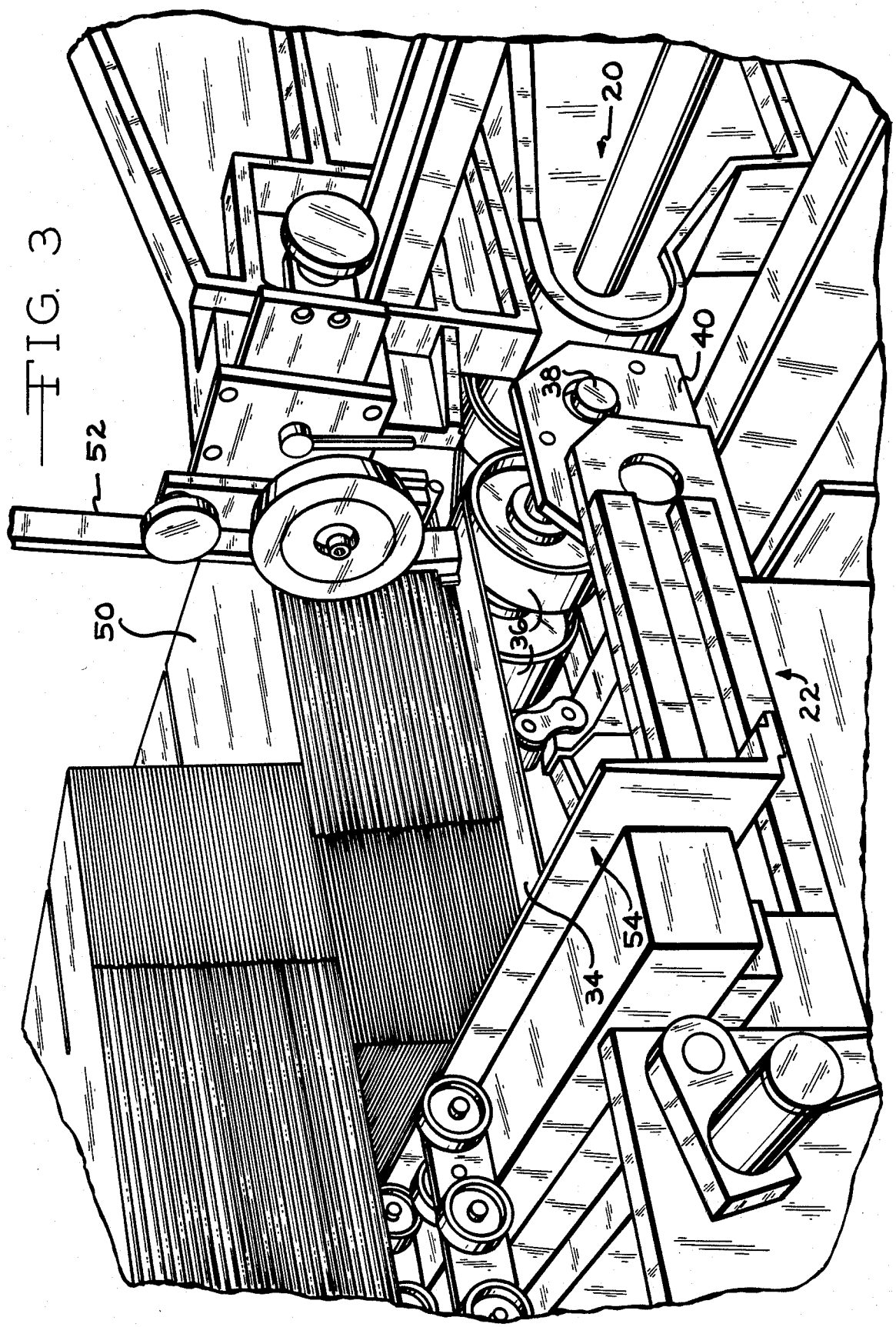
FIG. 3 is a perspective view of the conversion belt and stop plate assembly in operation, according to the present invention.

The front-most portion of the stacking section 22 is shown in FIGS. 2 and 3. The portion of the stacking section 22 closest to the delivery section 20 consists of a plurality of drive belts 34, each of which passes around a driven front or leading roller 36. Each of the rollers 36 is connected to a common axle 38 which is attached to the side of the stacking section 22 by an extension plate 40. This need for the extension plate 40 is explained by comparing the schematics of the prior art apparatus 42 in FIGS. 9 and 10 with the schematic of the present invention in FIG. 4.

Figure 9:
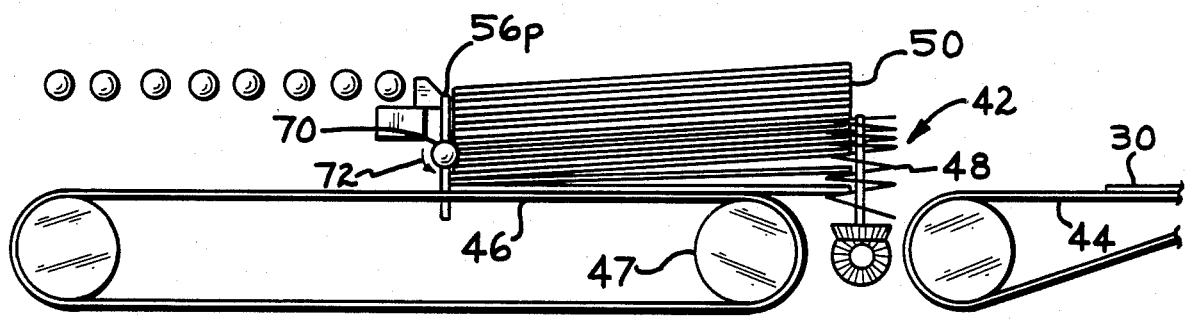
FIG. 9 is a schematic drawing of the prior art delivery and stacking sections, including a vertical spiral gear and a stop plate with a row of rollers and the drive belts passing through the stop plate.
Figure 10:
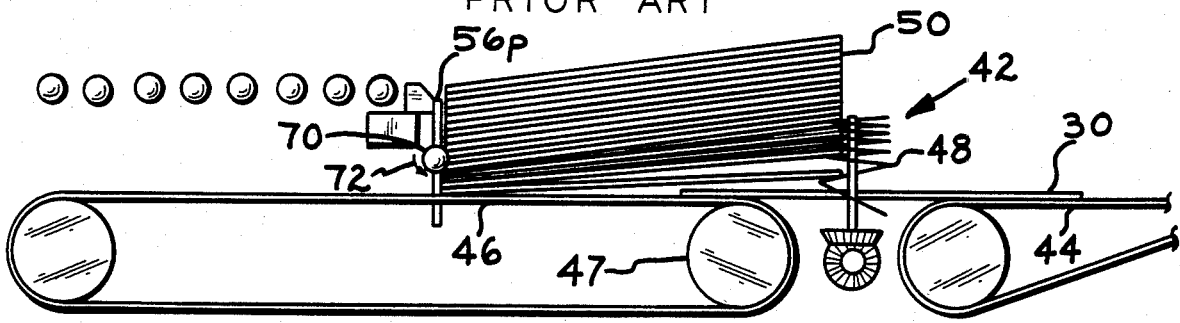
FIG. 10 is a schematic view of the apparatus in FIG. 9 which also shows a box exiting the delivery section, passing through the spiral gear and being driven underneath the previously stacked boxes.

In the prior art configuration of FIGS. 9 and 10, the top surface of the belts 44 and 46 in the delivery and stacking sections 20 and 22 respectively, lie in the same plane and are separated by a spiral lifting gear 48. As a result, there is a considerable distance between the two sets of belts 44 and 46. When the spiral lifting gear 48 is removed, there is too great a distance between the sets of belts 44 and 46 and so an extension plate 40 is installed to lessen the gap, as shown in FIGS. 2 and 3. The belts 44 and 46 are thus brought closer together to reduce the distance within which the boxes, especially short boxes, must travel unattended.

Figure 4:
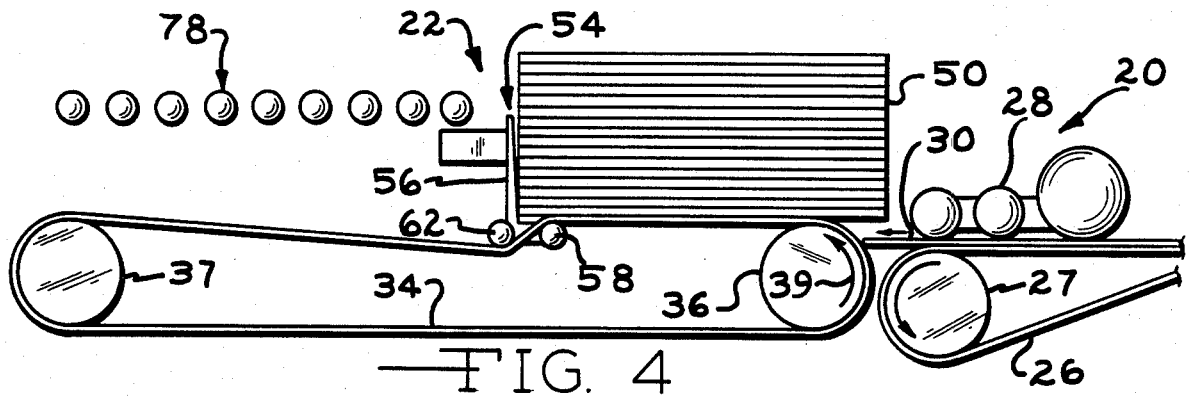
FIGS. 4 through 7 are schematic views of the conversion belt and stop plate assembly in use, according to the present invention.

A comparison of FIGS. 4 and 9 will also reveal that the rollers 36 and belts 34 in the stacking section 22 of the present invention have been raised up relative to the belts 46 and rollers 47 of the prior art structure in FIGS. 9 and 10. This was done so that the exiting box 30 could be fed into the bottom of the stack 50 without running into the bottom-most box of the stack 50.

Figure 8:
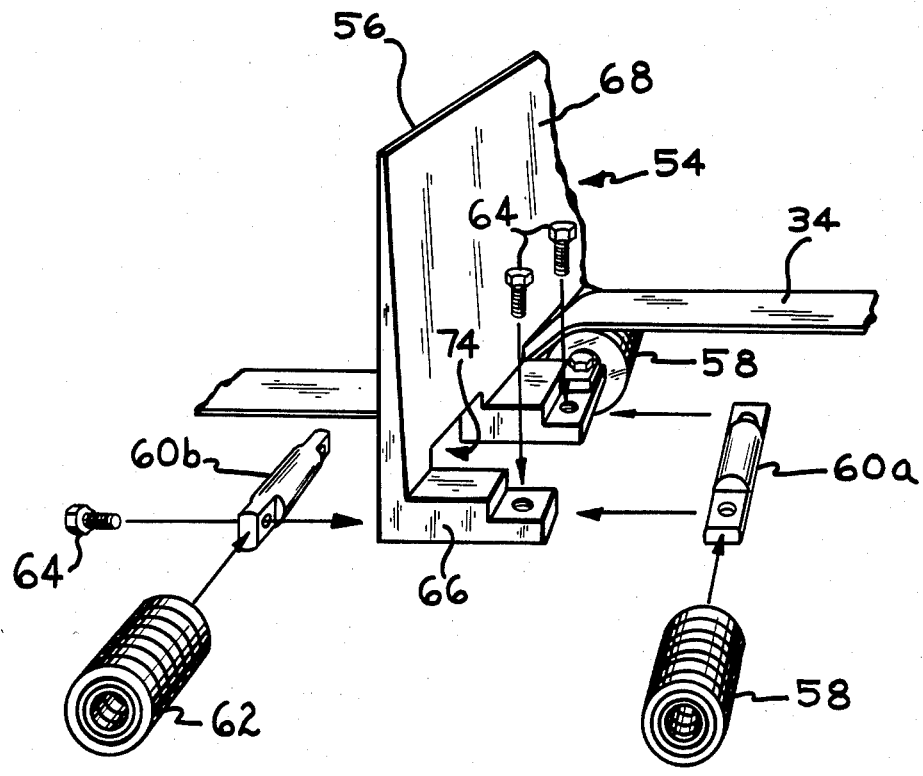
FIG. 8 is an exploded side view of the stop plate assembly, according to the present invention.

Adjacent the rollers 36 and belts 34 of the stacking section 22 is an alignment mechanism 52 which aligns the sides of the boxes as the stack of boxes increases. (See FIG. 3). Positioned across the tops of the belts 34 in the stacking section 22 is an improved stop plate assembly 54. As shown in FIG. 8, the stop plate assembly 54 consists of a stop plate 56, upper guide rollers 58 mounted on axles 60a and lower guide rollers 62 mounted on axles 60b. The plurality of drive belts 34 engage the upper guide rollers 58 and lower guide rollers 62. Bolts 64 or other suitable means are used to secure the axles 60a-b to the stop plate 56.

The stop plate 56 has a segmented base 66 and a vertical front face 68 which slants rearwardly. The prior art stop plate 56p, as shown in FIGS. 9 and 10, has a vertical front face which is perpendicular to the surface of the belts 46. In addition, the prior art stop plate 56p has knurled wheels 70 which rotate in the direction of the arrow 72. The wheels 70 of the prior art stop plate 56p tend to grind material off the leading edges of the boxes which often clogs the wheels 70, thus necessitating servicing. These wheels 70 are not present in the improved stop plate 56 shown in FIG. 8.

Referring again to the prior art structure 42 shown in FIGS. 9 and 10, the boxes 50 slant downwardly toward the stop plate 56p due to the spiral lifting gears 48 elevating the rear of the boxes 50. As a result, the boxes tend to bind up on the vertical surface of the prior art stop plate 56p.

Figure 5:
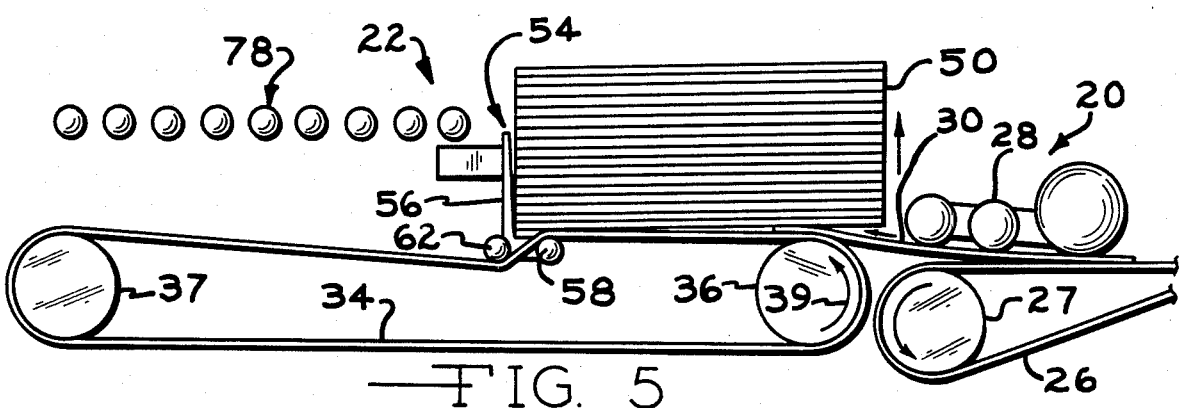
Figure 6:
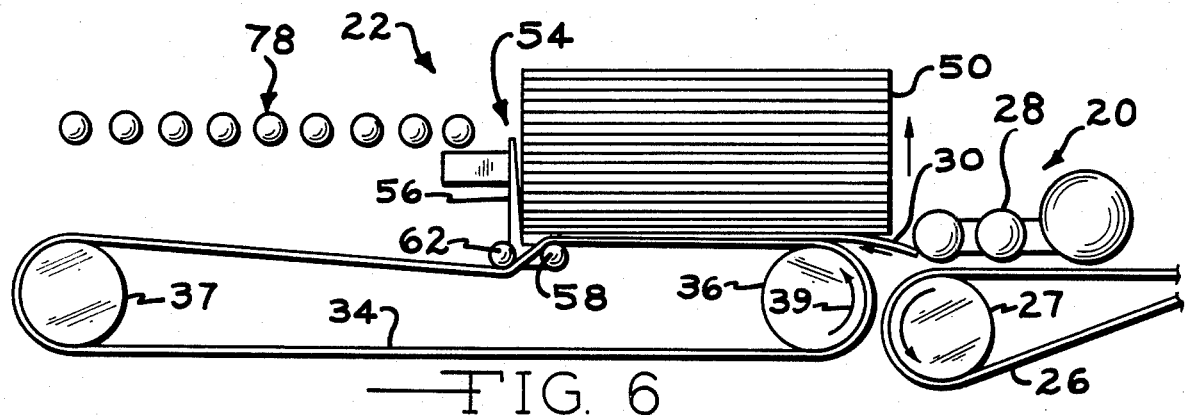

The boxes 50 in the present embodiment are now parallel to the surface of the drive belt 34, (see FIGS. 4-6). In addition, by slanting the front face 68 of the stop plate 56 rearwardly, the leading edges of the boxes do not bind up on the front surface 68 of the stop plate 56 as the boxes move upwardly. Consequently, the vertical stacking process is much simpler and smoother.

As can be seen in FIG. 8, the upper and lower guide rollers 58 and 62 rotate about axles 60a,b which are held in place by bolts 64. The stop plate 56 has recesses 74 cut into the base 66 to allow the belts 34 to pass down and through the stop plate. The upper guide rollers 58 are positioned in front of the recess 74 and the lower rollers 62 are positioned behind and attached to the rear of stop plate 56 and extend below the recess 74 as shown in FIGS. 4-8.

The drive belts 34 pass over the top of the upper rollers 58, down and through the recesses 74 and then underneath the lower rollers 62. From here the drive belts 34 pass around rearward rollers 37 and then back around the driven leading rollers 36 as shown in FIGS. 4-7. It should be noted that the drive belts 34 can be driven by either the leading or rearward rollers 36 and 37.

As a box 30 comes into the bottom of the stack 50, the rest of the stack 50 moves upwardly. Should the box 30 have any chips attached to it, they can do one of two things given the improved stop plate assembly 54. First, the chips can go in, hit the front wall and then move up with the boxes as opposed to getting caught between the drive belts 34 and the prior art stop plate 56p as they were prone to do with the prior art structure. Second, the chips can travel down into the recess 74 and be pulled off the box 30 by the lower roller 62 which again avoids the problem of jamming.

Figure 7:
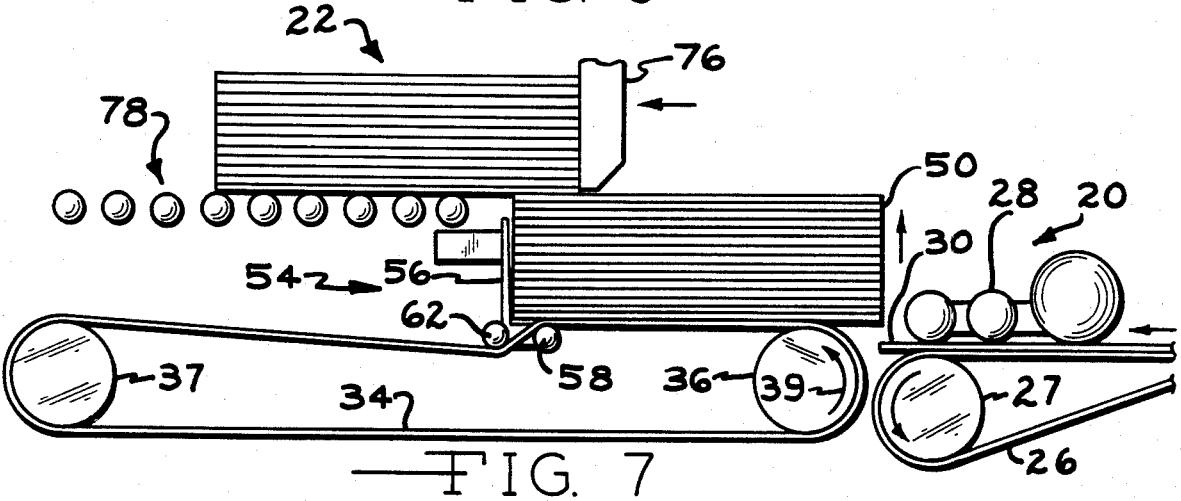

Having described the various components of Applicant's invention, the overall operation of Applicant's improved conversion belt and stopplate assembly for upstacking corrugated box machinery will be described in conjunction with the schematics of FIGS. 4-7. Referring to FIG. 4, as the newly formed box 30 emerges from the delivery section 20 it contacts the drive belts 34 on the upper halves of the leading rollers 36. The leading rollers 36 are moving in the direction of the arrow 39 thus causing the drive belts 34 to move upwardly. Consequently, as the leading edge of the box 30 contacts the drive belts 34, it rides up the front of the rollers 36 and underneath the bottom-most box in the stack 50. As the belts 26 of the delivery section 20 continue to push the box 30 underneath the stack of boxes 50, the emerging box 30 is pinched between the box stack 50 and the rotating drive belts 34 as shown in FIG. 5. Thus, as the delivery belts 26 push the box 30 toward the stop plate 56, the stacking section drive belts 34 also pull the box 30 toward the stop plate 56. Finally, as shown in FIG. 6, the box 30 is no longer driven by the delivery section belts 26 and is instead propelled the rest of the distance to the stop plate 56 solely by the stacking section drive belts 34. As shown in FIG. 7, once one box has been propelled all the way to the stop plate 56, the process begins again with a new box until a sufficient height of boxes is built up. At this point, an arm 76 swings down and removes a preselected quantity of boxes from the stack 50. The boxes then move down a set of skate rollers 78 to be prepared for shipping.

Should a box chip still be attached to a box entering the stack 50, it can either travel up the stack 50 with the rest of the boxes or it can pass beneath the stop plate 56 due to the recess 74 in the base 66 and the positioning of the rollers 58 and 62. If the chip passes underneath the stop plate 56, it will eventually fall off the drive belts 34 rearward of the stack 50. In either event, the chances of the box chips causing a jam are greatly reduced.

Having thus described Applicant's invention, various modifications and changes may be made in the above-described preferred embodiment of the invention without departing from the spirit and scope of the following claims.

What I claim:

1. In a corrugated box machine having an inking apparatus, a gluing apparatus, and a folding apparatus, including delivery belts, the invention comprising an improved delivery and stacking apparatus, a plurality of drive belts for receiving boxes as they are discharged from the folding apparatus, said drive belts being mounted for movement around leading rollers adjacent the folding apparatus and rearward rollers spaced from said leading rollers, said drive belts having a horizontal upper surface which is raised above said delivery belts whereby the boxes contact said drive belts on the upper halves of said leading rollers, said leading rollers moving the boxes upwardly to a stacked relationship atop said horizontal upper surface of said drive belts and a stop plate positioned contiguous said horizontal upper surface at a location between said leading rollers and said rearward rollers, said stop plate extending across said horizontal upper surface to stop and align the leading edge of an entering box with the stacked boxes, said stop plate having a front face which slants rearwardly relative to said horizontal upper surface thereby forming an obtuse angle with said horizontal upper surface of said drive belts to cause the leading edges of the stacked boxes to lose contact with said front surface of said stop plate as the stacked boxes move upwardly.

2. In a corrugated box machine according to claim 1, wherein said stop plate further includes a base with recesses located in said base to allow passage of said drive belts down and through said stop plate, upper guide rollers positioned in front of said recesses and lower guide rollers positioned behind and extending below said recesses in said stop plate, said upper and lower guide rollers being mounted on axles which are operatively connected to said base of said stop plate, said axles for said upper guide rollers being attached to the front of said stop plate and said axles for said lower guide rollers being attached to the rear of said stop plate, said drive belts passing over the top of said upper rollers, said drive belts then passing down and through said recesses and then underneath said lower rollers and toward said rearward rollers.

3. In a corrugated box machine having an inking apparatus, a gluing apparatus and a folding apparatus including delivery belts, the invention comprising an improved delivery and stacking apparatus, a plurality of drive belts for receiving boxes as they are discharged from the folding apparatus, said drive belts being mounted for movement around leading rollers adjacent the folding apparatus and rearward rollers spaced from said leading rollers, said drive belts having a horizontal upper surface which is raised above said delivery belts whereby the boxes contact said drive belts on the upper halves of said leading rollers, said leading rollers moving the boxes upwardly to a stacked relationship atop said horizontal upper surface of said drive belts and a stop plate positioned contiguous said horizontal upper surface at a location between said leading rollers and said rearward rollers, said stop plate extending across said horizontal upper surface to stop and align the leading edge of an entering box with the stacked boxes, said stop plate having a front face which slants rearwardly relative to said horizontal upper surface thereby forming an obtuse angle with said horizontal upper surface of said drive belts to cause the leading edges of the stacked boxes to lose contact with said front surface of said stop plate as the stacked boxes move upwardly, said stop plate having a base with a plurality of recesses located in said base to allow passage of said drive belts down and through said stop plate, upper guide rollers positioned in front of said recesses and lower guide rollers positioned behind and extending below said recesses in said stop plate, said upper and lower guide rollers being mounted on axles which are operatively connected to said stop plate, said axles for said upper guide rollers being attached to the front of said stop plate and said axles for said lower guide rollers being attached to the rear of said stop plate, said drive belts passing over the top of said upper rollers, said drive belts then passing down and through said recesses of said stop plate and then underneath said lower rollers and toward said rearward rollers.

* * * * *